United States Patent
Klump

(10) Patent No.: US 8,328,684 B2
(45) Date of Patent: Dec. 11, 2012

(54) METHOD FOR CONTROLLING THE CREEPING PROPERTIES OF A MOTOR VEHICLE

(75) Inventor: Markus Klump, Buehlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 841 days.

(21) Appl. No.: 12/478,487

(22) Filed: Jun. 4, 2009

(65) Prior Publication Data

US 2009/0305844 A1 Dec. 10, 2009

(30) Foreign Application Priority Data

Jun. 5, 2008 (DE) .......................... 10 2008 027 068

(51) Int. Cl.
*F16H 61/48* (2006.01)
*F16D 48/06* (2006.01)
*B60W 10/02* (2006.01)
*B60W 10/06* (2006.01)

(52) U.S. Cl. ............................. 477/54; 477/73; 477/203

(58) Field of Classification Search ................... 477/54, 477/73, 84, 203
See application file for complete search history.

(56) References Cited

U.S. PATENT DOCUMENTS

| 5,989,153 A * | 11/1999 | Fischer et al. ................... 477/74 |
| 7,134,538 B2 * | 11/2006 | Hasegawa et al. .......... 192/220.1 |
| 2002/0035010 A1 * | 3/2002 | Kobayashi ...................... 477/54 |

* cited by examiner

*Primary Examiner* — Edwin A Young
(74) *Attorney, Agent, or Firm* — Simpson & Simpson, PLLC

(57) ABSTRACT

A method for controlling a creeping process of a motor vehicle with an internal combustion engine, a torque converter with a pump shell driven by the internal combustion engine and a turbine shell driving an automated transmission and a separation clutch disposed in the torque flow between the internal combustion engine and the torque converter, wherein a creeping process is initiated when a gas pedal for driver control of the internal combustion engine and a brake pedal are not actuated and a driving velocity of the motor vehicle is less than a predetermined value. In order to be able to perform the creeping process with converter slippage and also with slippage of the separation clutch a creep torque transmitted through the separation clutch is adjusted as a function of the slippage of the torque converter for initiating the creeping process and during the creeping process.

15 Claims, 2 Drawing Sheets

METHOD FOR CONTROLLING THE CREEPING PROPERTIES OF A MOTOR VEHICLE

CROSS-REFERENCE TO RELATED APPLICATIONS

This patent claims priority of German Patent Application No. 10 2008 027 068.7, filed on Jun. 5, 2008, which application is incorporated herein by reference.

FIELD OF THE INVENTION

The invention relates to a method for controlling a creeping process of a motor vehicle with an internal combustion engine and an automated transmission, wherein a torque converter is disposed between the internal combustion engine and the transmission and a separation clutch is disposed between the internal combustion engine and the torque converter.

BACKGROUND OF THE INVENTION

Motor vehicles with automatic transmissions or automated variable speed transmissions are known. Torque converters are connected between the internal combustion engine and the transmission as a startup element and for providing a torque conversion during startup, which torque converters are used as startup clutches due to the coupling of the input side pump shell to the output side turbine shell by means of a viscous operating means, wherein without actuating the brake pedal, a residual torque is transferred through the torque converter during idle of the internal combustion engine, which leads to a creeping, this means a slow movement of the motor vehicle. Creeping is particularly advantageous during driving in traffic jams or in stop-and-go traffic, since the motor vehicle can be moved exclusively by actuating the brake pedal, which prevents a creeping process by braking the creep torque generated by the torque converter.

When the motor vehicle shall not be moved, the energy provided for creeping is dissipated or converted into waste heat of the torque converter. This leads to an increased fuel burn. Consequently, a drive train in a motor vehicle is being used, which comprises a separation clutch between the internal combustion engine and the torque converter, so that the torque converter can be decoupled, when the motor vehicle stands still. When the separation clutch is opened completely, the torque converter stands still with the motor vehicle standing still, this means, the motor vehicle does not creep anymore.

The condition is comparable to a motor vehicle with automated friction clutch and an automated variable speed transmission. In order to provide properties to these motor vehicles, which are similar to the creeping of motor vehicles with torque converters, the automated friction clutch is operated with slippage, and thus a small torque is provided through the friction clutch, which moves the motor vehicle at a predetermined velocity. Since the creeping process does not start by itself like in a motor vehicle with a torque converter, the creeping process must be initiated by a control system. Thus, the actuation of the gas pedal and of the brake pedal is evaluated as initiation criteria. When both pedals are not actuated, a creeping process may be initiated while maintaining time based criteria, like, e.g., a time delay. In automated friction clutches with a creeping device, a torque augmentation, which is provided in a torque converter, is not provided.

BRIEF SUMMARY OF THE INVENTION

Thus, it is the object of the invention to provide a control for a creeping method for a drive train with a torque converter, which can be decoupled from an internal combustion engine, in which the separation clutch is actuated in coordination with the torque converter for initiating and performing the creeping process.

The object is accomplished by a method for controlling a creeping process of a motor vehicle with an internal combustion engine, a torque converter with a pump shell driven by the internal combustion engine and a turbine shell driving the transmission and an automated transmission and a separation clutch, disposed in the torque flow between the internal combustion engine and the torque converter, wherein a creeping process is initiated, when a gas pedal for driver control of the internal combustion engine and a brake pedal are not actuated and a driving velocity of the motor vehicle is less than a predetermined value, and a creep torque transferred through the separation clutch is adjusted as a function of a speed characteristic of the torque converter.

Thus, the torque converter advantageously is a multifunction converter with a stator shell supported at the housing by means of a freewheeling clutch for torque increase at low speeds. Furthermore, the torque converter can be a so-called hard torque converter with a comparatively steep moment characteristic over the speed of the pump shell. A hard configuration is facilitated in particular through the proposed creep control, since the separation clutch can be operated with slippage accordingly. A control of the separation clutch with respective slippage, as a function of the slippage of the torque converter, can thus in combination also lead to a soft converter characteristic, this means a large slippage range with torque augmentation. When the torque converter is configured as a multifunction converter, the separation clutch can be disposed in the converter housing, e.g., axially adjacent to a converter lockup clutch, which bridges the torque converter at high speeds of the pump shell and which establishes a direct connection between the output component of the separation clutch and the input shaft of the transmission. In this case, the separation clutch is actuated in a similar manner as the converter lockup clutch through a piston, which is loaded by a pressure imparted by an operating means flow inducted through a supply channel, which loading pressure is greater than the pressure prevailing in the converter housing. Alternatively, the separation clutch can be disposed outside of the converter housing and it can be actuated by a clutch actuator, e.g., a hydraulic, electromechanical or hydrostatic actuator, by an electric drive or similar driving means.

In an advantageous embodiment, the creep torque of the separation clutch can be adjusted as a function of a characteristic variable for characterizing the torque characteristic in the form of a speed ratio of a speed of the turbine shell relative to a speed of the pump shell. Thus, e.g., a representation of the creep torque is stored in a characteristic diagram or as a characteristic curve as a function of the speed ratio, and alternatively, as a function of other variables, like properties of the converter as a function of the temperature and viscosity of the operating means of the torque converter and similar. When it is detected, e.g., from a non-actuated gas or brake pedal, that a creeping process is required, a creep torque according to the characteristic diagram is applied and regulated. Thus, a startup value is adjusted when there is no slippage. Due to the upcoming creep torque, the speed ratio of the torque converter changes, since the pump shell is driven, and the turbine shell still stands still. A respective setpoint tracing of the creep torque is performed by regulation, so that starting with a maximum creep torque at a small speed ratio, the creep torque is decreased with increasing slippage, so that a constant creep torque is provided at medium and large speed ratios and the torque converter is operated at a good conversion ratio, this means at a torque augmentation optimized as a function of the speed ratio. It has proven advantageous, when the creep torque decreases from the maximum creep torque to the minimum creep torque between torque ratios of 0.2 and 0.6.

Furthermore, the creep torque can be additionally adjusted as a function of the maximum gradient for increasing and decreasing the creep torque, which gradient is a function of the speed ratio. In the same way as the creep torque, which is a function of the speed ratio, the maximum gradients can also be stored in the form of a characteristic diagram or in the form of a characteristic curve. Thus, the characteristic curve of the maximum gradient for increasing the creep torque advantageously decreases with increasing torque ratios, e.g., the maximum gradient decreases from a maximum value when there is no slippage and reaches a minimum value at speed ratios $\geq 0.6$, which minimum value remains constant towards greater speed ratios. The maximum gradient for decreasing the creep torque, however, advantageously comprises a maximum, which is adjusted, e.g., at speed ratios between 0.8 and 1.0.

In another embodiment, as long as a brake pressure sensor is provided in a brake system, a brake pressure used for actuating a brake can be detected and the creeping process can be initiated as a function of the brake pressure. Thus, the creeping process can be initiated at an existing brake pressure by starting up the motor vehicle up against the brake pressure. For this purpose the creep torque is set higher than the brake torque set by the brake pressure. Thereby a motor vehicle can already start creeping at a remaining residual torque of the brake, so that an immediate startup, e.g., on a slope, or a quick startup in a traffic jam is possible.

Alternatively or additionally, a pedal travel of a brake pedal can be detected and the creeping process can be initiated as a function of the pedal travel. Also in this case, a creep torque can already be imparted when the brake is not completely released. When neither a brake pressure sensor, nor a pedal travel sensor is provided, the brake light signal and/or an annunciation signal for a parking brake can be used as a signal indicating a non-actuated brake.

BRIEF DESCRIPTION OF THE DRAWINGS

The invention is described in more detail with reference to FIGS. 1-4, wherein.

DETAILED DESCRIPTION OF THE INVENTION

Figure 1:
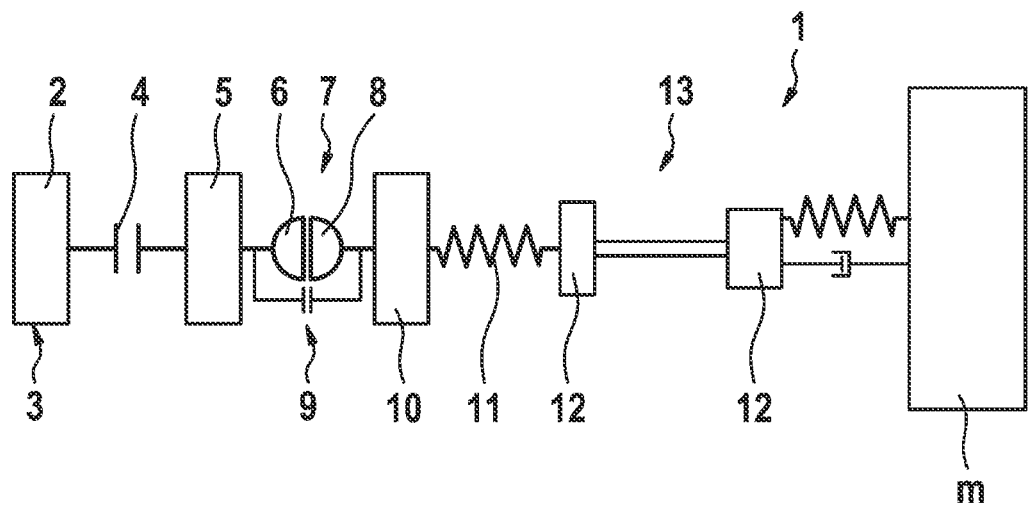
FIG. 1 shows a schematically depicted mass model of a drive train with a torque converter and a separation clutch.

FIG. 1 shows a mass model of a drive train 1 with an internal combustion engine 2 with a primary rotating mass 3, e.g., a flywheel and a separation clutch 4. The separation clutch 4 couples the primary rotating mass 3 with a secondary rotating mass 5, e.g., a converter housing with a pump shell 6. Simultaneously, the separation clutch 4 couples the internal combustion engine 2 with the torque converter 7, which is connected through the pump shell 6 with the separation clutch 4. The torque converter 7 is comprised of the input side pump shell 6 and the output side turbine shell 8, and a stator shell (not shown) connected to the housing. The pump shell 6 and turbine shell 8 can be bridged by the converter lockup clutch 9, so that the decreasing efficiency of the torque converter 7 at high speeds is overcome. The secondary rotating mass 5 and the turbine mass 10 are elastically connected with one another through the viscous connection by means of the operating means of the torque converter 7. Furthermore, the turbine mass is connected through the torsion elastic transmission input shaft 11 with the various transmission masses 12 of the transmission 13, which is elastically connected with the vehicle mass.

In order to initiate a creeping process and possibly a startup process, resulting therefrom, the masses have to be accelerated as quickly as possible. Thus, the separation clutch 4, which is completely open during standstill of the motor vehicle, shall be closed so that a creeping process can be performed using the torque augmentation of the torque converter. The separation clutch 4 is thus advantageously operated slipping, in particular when a startup is to be expected, so that the speed of the combustion engine is increased and possibly a turbo-hole is circumvented during startup, when an internal combustion engine with a turbocharger is being used.

For the creeping process, the behavior or the characteristic of the torque converter 7 is integrated into the control of the separation clutch 4. The characteristic results, e.g., from the speed characteristic of the turbine shell 8 as a function of the pump shell 6. Forming a speed ratio of the turbine shell 8 with respect to the pump shell 6 has proven particularly advantageous for the purpose.

Figure 2:
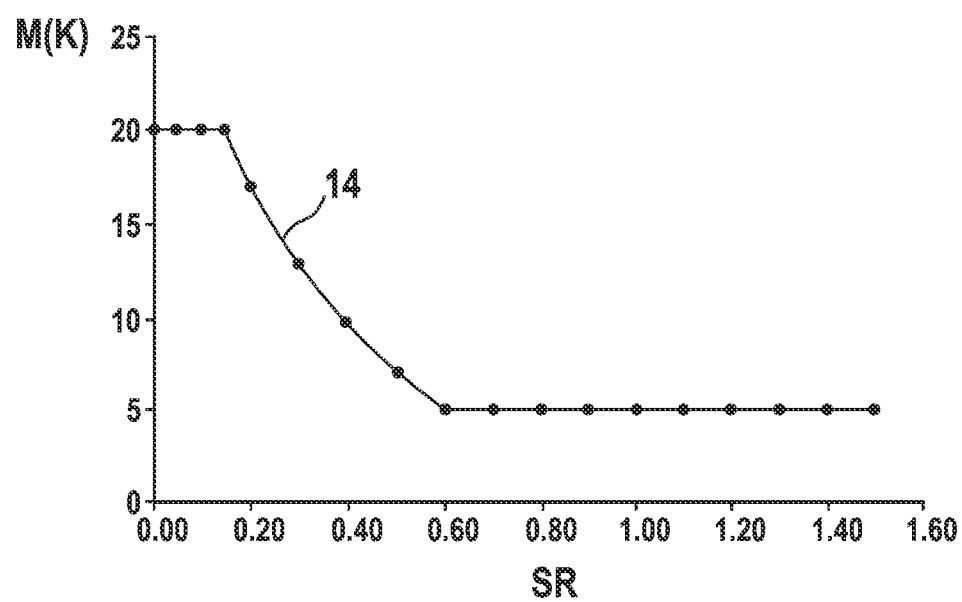
FIG. 2 shows a diagram of an embodiment of a creep torque characteristic curve as a function of the speed ratio of the torque converter.

FIG. 2, e.g., shows a characteristic curve 14, depicted in the form of discrete characteristic values, in which characteristic curve the creep torque M(K) is plotted over the speed ratio SR. Such characteristic curves can be stored in a control unit. When a creeping process occurs or when a creeping process is requested, the current speed ratio SR is detected and calculated from the pump speed and from the turbine speed and a creep torque is determined from the characteristic curve 14. The respective creep torque is stored as a target value of a clutch control, which determines a control variable for the actuation means depending on which actuation means is being used. For example when a separation clutch disposed in the converter housing is actuated by a piston actuated by differential pressure, a differential pressure is, e.g., determined from the creep torque based on another characteristic diagram, at which differential pressure the target value of the creep torque is adjusted.

The characteristic of the embodiment of the characteristic curve 14 shows a maximum creep torque, herein, e.g., 20 Nm, thus, e.g., with the pump shell standing still, which creep torque continuously decreases to the minimal creep torque of 5 Nm with increasing speed ratio SR in the range of 0.2 to 0.6. The minimum value of 5 Nm is increased by the torque increase of the torque converter. The creep torque M(K) can be configured as a characteristic diagram, into which, e.g., the vehicle weight, trailer operation, a grade of the road, the converter temperature, the clutch temperature and/or the ambient temperature, the type of internal combustion engine used and similar can be entered.

Figure 3:
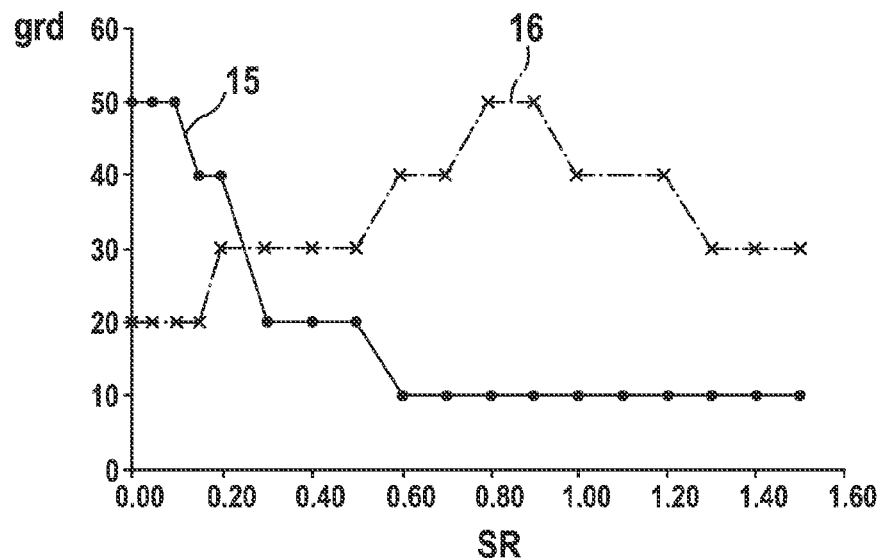
FIG. 3 shows a diagram of an embodiment of gradients for increasing and decreasing the creep torque as a function of the speed ratio of the torque converter; and, FIG. 4 shows a diagram for illustrating a creeping process.

In order to control the dynamics of the separation clutch, the creep torque can be determined using additional characteristic curves 15, 16 which are a function of a speed ratio and which are shown in FIG. 3. Thus the characteristic curves 15, 16 provide the maximum gradient grd of the change of the creep torque, e.g., of the creep torque M(K) of FIG. 2 over time (arbitrary units) as a function of the speed ration SR. The characteristic curve 15 shows the maximum gradient of the creep torque for the buildup of the creep torque and the characteristic curve 16 shows the maximum gradient of the creep torque for the decrease of the creep torque. Through the shape of the characteristic curves 15, 16 the dynamics can be adapted to the properties of the torque converter. Thus, e.g., the gradient for increasing the creep torque can be large at low speed ratios and it can decrease with increasing speed ratios, while the gradient for decreasing the creep torque reaches its maximum at speed ratios of 0.8 to 1.0, at which point the slippage becomes negligible. Through the interaction of the two opposite characteristic curves the creep torque is dynamically brought into the speed ratios SR at which the efficiency of the torque converter is optimum and comprises, e.g., the highest augmentation. Furthermore, the control provides a permanent slippage of the separation clutch, so that the speed of the combustion engine is advantageously increased in order to better come out of a turbo hole, which may be caused by a turbo charger which is not effective yet, in case a further start up shall be performed. Furthermore a hard torque converter can be imaged as a soft torque converter, so that the hard torque converter, which is more effective at higher speeds, has the properties of a soft torque converter, which is more comfortable at lower speeds.

Figure 4:
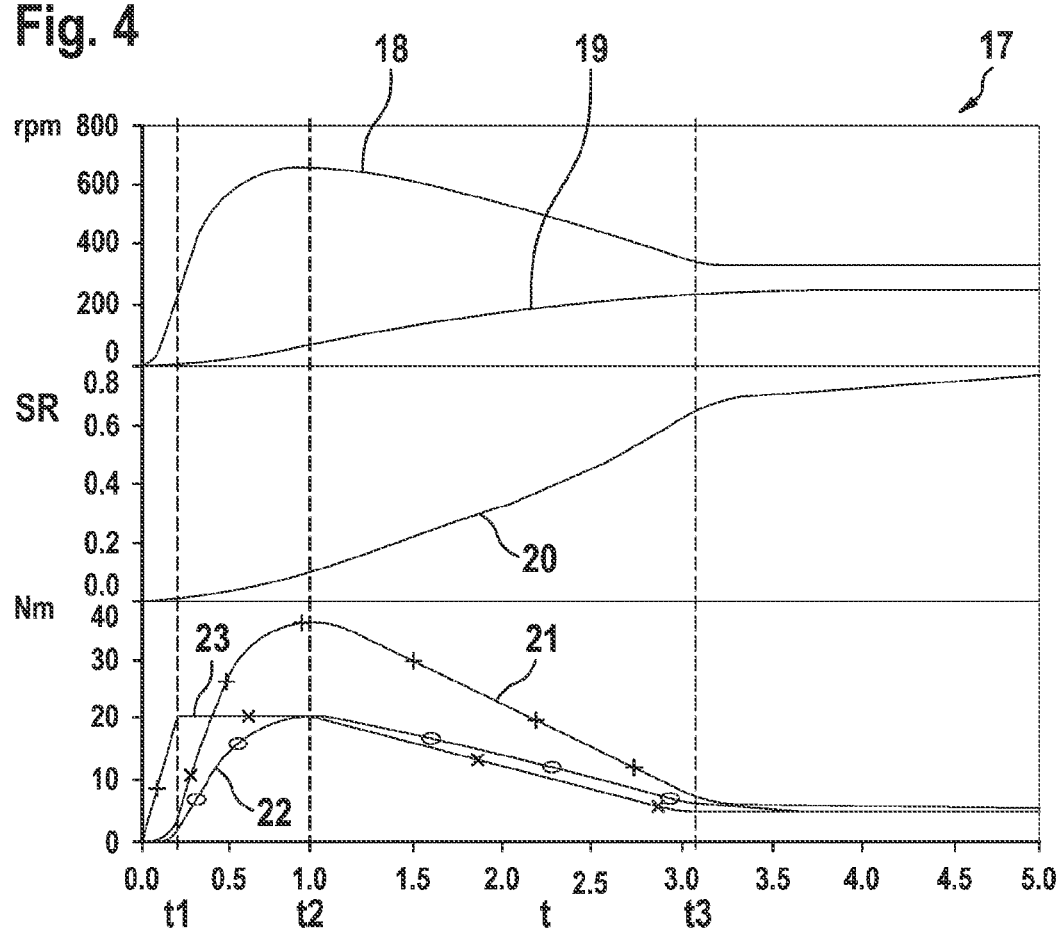

FIG. 4 shows a multi part diagram 17 with a creeping process over the time t. Herein, the development of the speed of the pump shell is illustrated in the upper third of the diagram 17 by the curve 18 and the development of the speed of the turbine shell over the time t is illustrated by curve 19. The center third shows the development of the speed ratio SR over time through the curve 20 and the lower third shows the torque of the turbine shell through the curve 21 and the symbols (+) and its shows the torque of the pump shell through the curve 22 and the symbols (o) and its shows the target value of the creep torque over the time t through the curve 23 and the symbols (x).

At the point in time t=0 the separation clutch is laid out completely with the internal combustion engine running and the brake actuated, pump shell and turbine shell stand still. When the brake is released, the creep process is initiated by applying the maximum creep torque to the separation clutch. Consequently the speed of the pump shell increases and the speed of the turbine shell increases at a lower rate, so that a relatively high speed ratio SR is caused, which causes a reduction of the creep torque at a point in time t1. The quick increase of the creep torque up to the point in time t1 occurs through a high gradient of the creep torque due to a small speed ratio SR. As soon as the speed ratio increases, a reduction of the gradient occurs according to FIG. 3, characteristic curve 15.

At the point in time t2, the pump shell reaches the torque of the creep torque transferred through the separation clutch, so that due to the increasing torque augmentation of the turbine shell, the creep torque can be further reduced according to the characteristic curve 14 of FIG. 2 and according to the characteristic curve 16 of FIG. 3. The reduction of the creep torque causes the speed of the pump shell and the torques of the pump shell and of the turbine shell to decrease until the maximum creeping velocity is reached at a minimum creep torque at the point in time t3 and constant creep properties are being maintained.

During a breaking or a roll out of the motor vehicle from higher velocities than the creeping velocity the separation clutch is opened accordingly when the creeping velocity is reached with the brake not being actuated and the gas pedal not being actuated according to the characteristic curves 14, 15, 16 of FIGS. 2 and 3, and a respective creeping process is performed. When the brake pedal is actuated, the creeping process is stopped until the brake is released again. The operating brake and also the parking brake can be evaluated as brakes.

REFERENCE NUMERALS AND DESIGNATIONS

1 Drive train
2 Internal combustion engine
3 Primary rotating mass
4 Separation clutch
5 Secondary rotating mass
6 Pump shell
7 Torque converter
8 Turbine shell
9 Converter lock up clutch
10 Turbine mass
11 Transmission input shaft
12 Transmission mass
13 Transmission
14 Characteristic curve
15 Characteristic curve
16 Characteristic curve
17 Diagram
18 Curve
19 Curve
20 Curve
21 Curve
22 Curve
23 Curve
m Vehicle mass
grd Gradient
M(K) Creep torque
SR speed ratio
t time
t1 Point in time
t2 Point in time
t3 Point in time

What I claimed is:

1. A method for controlling a creeping process of a motor vehicle with an internal combustion engine (2), a torque converter (7) with a pump shell (6) driven by the internal combustion engine (2) and a turbine shell (8) driving an automated transmission (13) and a separation clutch (4) disposed in the torque flow between the internal combustion engine (2) and the torque converter (7), comprising:
   initiating a creeping process when a gas pedal for driver control of the internal combustion engine (2) and a brake pedal are not actuated and a driving velocity of the motor vehicle is less than a predetermined value; and,
   adjusting a creep torque (M(K)) transmitted through the separation clutch (4) during the creeping process as a function of speed properties of the torque converter (7).

2. The method according to claim 1, further comprising adjusting the creep torque (M(K)) as a function of a speed characteristic variable of the torque converter, characterized in the form of a speed ratio (SR) of a speed of the turbine shell (8) to a speed of the pump shell (6).

3. The method according to claim 2, further comprising adjusting the creep torque (M(K)) as a function of a maximum gradient for increasing the creep torque (M(K)), which maximum gradient is a function of the speed ratio (SR).

4. The method according to claim 3, further comprising decreasing the maximum gradient for increasing the creep torque (M(K)) with increasing speed ratios (SR).

5. The method according to claim 4, further comprising minimizing or maintaining constant the maximum gradient for increasing the creep torque (M(K)) at speed ratios (SR) greater than or equal to 0.6.

6. The method according to claim 2, further comprising adjusting the creep torque (M(K)) as a function of a maximum gradient for decreasing the creep torque (M(K)), which maximum gradient is a function of the speed ratio (SR).

7. The method according to claim 6, wherein the maximum gradient for decreasing the creep torque (M(K)) comprises a maximum.

8. The method according to claim 7, further comprising setting the maximum at speed ratios (SR) between 0.8 and 1.0.

9. The method according to claim 2, further comprising storing the creep torque (M(K)) and/or at least one of the gradients in a characteristic diagram which is at least a function of the speed ratio (SR).

10. The method according to claim 2, further comprising decreasing the creep torque (M(K)) with increasing speed ratios (SR).

11. The method according to claim 10, further comprising decreasing the creep torque (M(K)) from a maximum creep torque to a minimum creep torque between speed ratios (SR) of 0.2 and 0.6 and otherwise maintaining the creep torque constant.

12. The method according to claim 2, further comprising storing the creep torque (M(K)) or at least one of the gradients in a characteristic diagram which is at least a function of the speed ratio (SR).

13. The method according to claim 1, further comprising:
detecting a brake pressure for actuating a brake; and
initiating the creeping process as a function of the brake pressure.

14. The method according to claim 13, further comprising initiating the creeping process at a predetermined brake pressure, wherein the creep torque (M(K)) is greater than the brake moment adjusted by the brake pressure, the method further comprising creeping the vehicle against the brake torque.

15. The method according to claim 1, further comprising:
detecting a pedal travel of the brake pedal; and
initiating the creep process as a function of the pedal travel.

* * * * *